US010357731B2

(12) United States Patent
Von Seggern et al.

(10) Patent No.: US 10,357,731 B2
(45) Date of Patent: Jul. 23, 2019

(54) FILTER WITH PREFORMED END CAPS HAVING NOTCH FEATURE

(71) Applicants: Michael J. Von Seggern, Kearney, NE (US); Jeffrey E.D. Rogers, Kearney, NE (US)

(72) Inventors: Michael J. Von Seggern, Kearney, NE (US); Jeffrey E.D. Rogers, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 67 days.

(21) Appl. No.: 15/384,642

(22) Filed: Dec. 20, 2016

(65) Prior Publication Data

US 2018/0169555 A1 Jun. 21, 2018

(51) Int. Cl.
*B01D 46/00* (2006.01)
*B01D 46/52* (2006.01)

(52) U.S. Cl.
CPC ..... *B01D 46/0004* (2013.01); *B01D 46/0001* (2013.01); *B01D 46/0005* (2013.01); *B01D 46/521* (2013.01); *B01D 46/526* (2013.01); *B01D 2265/027* (2013.01); *B01D 2271/022* (2013.01); *B01D 2275/205* (2013.01); *B01D 2279/60* (2013.01)

(58) Field of Classification Search
CPC ............ B01D 46/0001; B01D 46/0004; B01D 46/0005; B01D 46/521; B01D 2265/027; B01D 2275/205; B01D 2279/60
See application file for complete search history.

(56) References Cited

U.S. PATENT DOCUMENTS

| 3,679,057 | A | * | 7/1972 | Perez | B01D 46/0001 210/223 |
| 4,885,015 | A | * | 12/1989 | Goulet | B01D 46/0001 156/227 |
| 5,376,270 | A | * | 12/1994 | Spearman | B01D 46/0005 210/445 |
| 5,536,290 | A | | 7/1996 | Stark et al. | |
| 5,820,646 | A | | 10/1998 | Gillingham et al. | |
| 6,190,432 | B1 | | 2/2001 | Gieseke et al. | |
| 6,306,192 | B1 | | 10/2001 | Greif et al. | |
| 6,348,084 | B1 | | 2/2002 | Gieseke et al. | |
| 6,387,143 | B1 | | 5/2002 | Adiletta | |
| 6,569,219 | B1 | | 5/2003 | Connor et al. | |
| 7,323,029 | B2 | | 1/2008 | Engelland et al. | |

(Continued)

FOREIGN PATENT DOCUMENTS

JP 2013-503735 A 2/2013

*Primary Examiner* — Jason M Greene
(74) *Attorney, Agent, or Firm* — Reinhart Boerner Van Deuren P.C.

(57) ABSTRACT

A filter including a filter media pack, first and second preform members and first and second adhesives is provided. The first preform member is disposed over the media pack. The first preform member has a wall defining a well. The wall defines a notch. The first adhesive in the well attaches the first preform member to the filter media pack. The first adhesive has a contact region disposed in the notch. The second preform member is disposed over the first preform member. The second adhesive bonds the first preform member over the first preform member. The second adhesive engages with the first adhesive at the contact region.

27 Claims, 10 Drawing Sheets

(56) References Cited

U.S. PATENT DOCUMENTS

| | | |
|---|---|---|
| 7,351,270 B2 | 4/2008 | Engelland et al. |
| 7,625,419 B2 | 12/2009 | Nelson et al. |
| 7,648,545 B2 | 1/2010 | Amesoeder et al. |
| 7,658,777 B2 | 2/2010 | Kopec et al. |
| 7,674,308 B2 | 3/2010 | Krisko et al. |
| 7,708,795 B2 | 5/2010 | Westlund |
| 7,713,321 B2 | 5/2010 | Kuennpel et al. |
| 7,964,010 B2 | 6/2011 | Lane et al. |
| 7,972,404 B2 | 7/2011 | Kuempel et al. |
| 8,034,145 B2 | 10/2011 | Boehrs et al. |
| 8,062,399 B2 | 11/2011 | Nelson et al. |
| 8,147,582 B2 | 4/2012 | Engelland et al. |
| 8,227,531 B2 | 10/2012 | Brown et al. |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,357,219 B2 | 1/2013 | Boehrs et al. |
| 8,382,875 B2 | 2/2013 | Engelland et al. |
| 8,480,779 B2 | 7/2013 | Boehrs et al. |
| 8,491,691 B2 | 7/2013 | Raether |
| 8,496,723 B2 | 7/2013 | Reichter et al. |
| 8,617,276 B2 | 12/2013 | Raether et al. |
| 8,636,820 B2 | 1/2014 | Reichter et al. |
| 8,709,119 B2 | 4/2014 | Reichter et al. |
| 2003/0217534 A1 | 11/2003 | Krisko et al. |
| 2005/0235620 A1 | 10/2005 | Connor et al. |
| 2007/0130896 A1 | 6/2007 | Walz et al. |
| 2007/0169448 A1* | 7/2007 | Osborne ............ B01D 46/0005 55/484 |
| 2007/0246417 A1 | 10/2007 | Wright et al. |
| 2008/0110142 A1 | 5/2008 | Nelson et al. |
| 2008/0115758 A1 | 5/2008 | Engelland et al. |
| 2010/0139629 A1 | 6/2010 | Engelland et al. |
| 2011/0173937 A1 | 7/2011 | Nelson |
| 2012/0110962 A1 | 5/2012 | Dewit et al. |
| 2012/0124947 A1 | 5/2012 | Dewit et al. |
| 2013/0167491 A1 | 7/2013 | Engelland et al. |
| 2013/0239530 A1 | 9/2013 | Reichter et al. |
| 2013/0298770 A1 | 11/2013 | Raether |
| 2014/0026527 A1 | 1/2014 | Bruce et al. |
| 2014/0102059 A1 | 4/2014 | Boehrs et al. |
| 2014/0260139 A1* | 9/2014 | Merritt ............... B01D 46/0005 55/488 |
| 2014/0318090 A1* | 10/2014 | Rieger ............... B01D 46/0001 55/502 |
| 2014/0318091 A1 | 10/2014 | Rieger et al. |
| 2015/0013282 A1 | 1/2015 | Sorger et al. |
| 2015/0075125 A1 | 3/2015 | Porbeni et al. |

\* cited by examiner

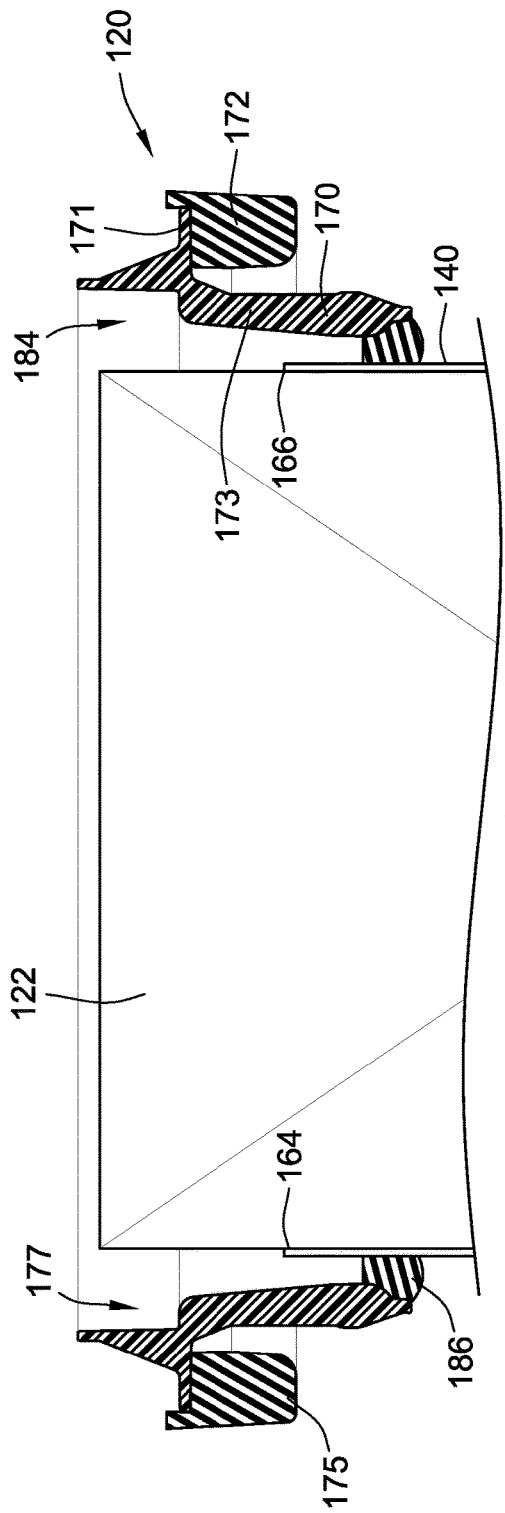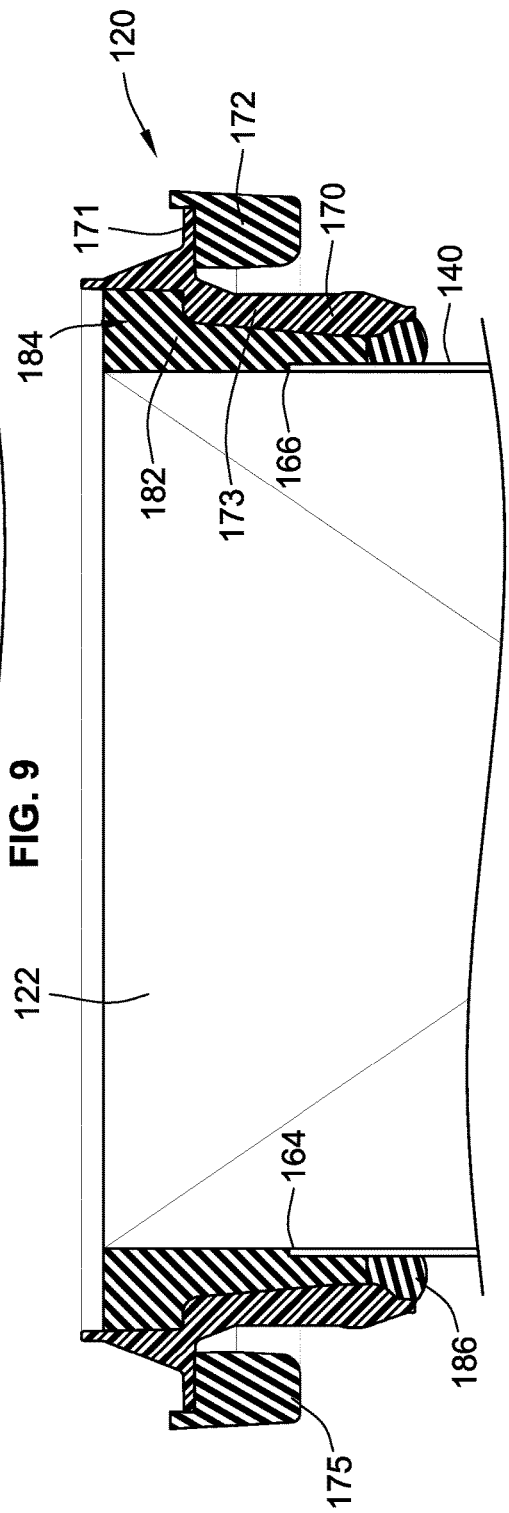

FILTER WITH PREFORMED END CAPS HAVING NOTCH FEATURE

FIELD OF THE INVENTION

This invention generally relates to filter elements for filtering a fluid.

BACKGROUND OF THE INVENTION

Filters (also referred to as filter elements) are used in systems to filter fluids for use by downstream systems. For instance, air filters are used to filter air prior to supplying the air to an internal combustion engine.

Filters are typically mounted in a filter housing that defines the fluid flow path in which the filter is situated. To prevent dirty fluid from bypassing filter media of the filter, a housing seal is often provided between the filter media and the housing. To be the most effective, it is important to provide a good seal between the seal arrangement and the filter media.

Depending on the application, the filter may take many different sizes or formed from numerous different filter materials. The complexity of the shape or the configuration of the filter can make it difficult to prevent leak paths between the seal arrangement and the filter media. This can be particularly true when numerous preformed components are required to be mounted to the filter media between the housing seal of the seal arrangement and the filter media.

BRIEF SUMMARY OF THE INVENTION

New and improved filter systems, filters for use in filter systems and methods of forming the filters are provided. The new and improved filters reduce the likelihood of forming a leak path between a seal arrangement and a filter media when one or more preform components are attached to the filter media.

In a particular embodiment, a filter element is provided. The filter element includes a block of filter media, first and second end caps, a first adhesive, a seal arrangement and a second adhesive. The block of filter media defines first and second flow faces, first and second sides extending between the first and second flow faces, and first and second ends extending between the first and second flow faces and the first and second sides. The first and second end caps are attached to the first and second ends of the block of filter media, respectively. Each of the first and second end caps includes a panel portion and a rectangular sidewall portion extending outward from the panel portion. The rectangular sidewall portion overlaps the first and second flow faces and the first and second sides. The rectangular sidewall portion includes first and second notches. The first notch overlaps the first side and the second notch overlaps the second side. The first adhesive material secures the first and second end caps to the first and second ends of the block of filter media, respectively. Each of the first and second notches in the first and second end caps exposes a portion of the first adhesive material. The seal arrangement is attached to the block of filter media and extends, at least in part, around the block of filter media and the first and second end caps. The second adhesive material sealingly secures the seal arrangement to the block of filter media and the first and second end caps. The second adhesive material contacts the first adhesive material exposed by the notches of the first and second end caps.

In one embodiment, the block of filter media is a block of pleated filter media formed from a plurality of folds and pleat panels forming a plurality of pleats. The folds and pleat panels extend between the first and second ends. The first and second end caps and first adhesive material sealing opposed ends of the pleats.

In one embodiment, the first and second adhesive materials are the same type of material.

In one embodiment, the first and second adhesive materials are foamed urethane.

In one embodiment, the rectangular sidewall portion defines a free end and a base end. The rectangular sidewall portion is attached to the panel portion at the base end. The first adhesive material does not extend beyond the free end of the rectangular sidewall portion.

In one embodiment, the seal arrangement fully covers the first and second notches are fully covered by the seal arrangement.

In one embodiment, all of the first and second notches have a same spacing relative to the first flow face.

In one embodiment, the first and second notches of the first end cap have a different spacing relative to the first flow face than the first and second notches of the second end cap.

In one embodiment, the first notches of the first and second end caps have a same first spacing relative to the first flow face and the second notches of the first and second end caps have a same second spacing relative to the first flow face. The first and second spacings are different.

In one embodiment, the seal arrangement includes a frame member and a housing seal member attached to the frame member.

In one embodiment, a shut-off material is located between the seal arrangement and the block of filter media to provide a shut-off between the seal arrangement and the block filter media inhibiting leakage of the second adhesive during assembly.

In one embodiment, a permeable mesh material overlaps the second flow face and the first and second sides.

In one embodiment, the permeable mesh material has opposed first and second ends that extend between the first and second end caps. The first and second ends of the mesh material are spaced apart from the first flow face such that the permeable mesh material overlaps less than the entire first side and overlaps less than the entire second side. The seal arrangement overlaps the first and second ends of the permeable mesh material.

In one embodiment, the seal arrangement has opposed sides with the block of filter media positioned therebetween. The opposed sides extending at a non-zero and non-perpendicular angle relative to the first and second flow face. The opposed sides of the seal arrangement extending across either the first and second ends or the first and second sides of the block of filter media.

In one embodiment, the second flow face is an outlet flow face and the first flow face is an inlet flow face.

In a further embodiment, a method of assembling a filter element is provided. The method includes providing a block of filter media defining first and second flow faces, first and second sides extending between the first and second flow faces, and first and second ends extending between the first and second flow faces and the first and second sides. The method includes attaching first and second end caps to the first and second ends of the block of filter media, respectively, with a first adhesive material. Each of the first and second end caps includes a panel portion and a rectangular sidewall portion extending outward from the panel portion. The rectangular sidewall portion overlaps the first and second flow faces and the first and second sides. The rectangular sidewall portion includes first and second notches. The first notch overlaps the first side and the second notch overlaps the second side. Each of the first and second notches in the first and second end caps expose a portion of the first adhesive material. The method includes positioning a seal arrangement adjacent to the block of filter media with the seal arrangement extending, at least in part, around the block of filter media and the first and second end caps. The method includes securing, sealingly, the seal arrangement to the block of filter media and the first and second end caps with a second adhesive material. The second seal material contacts the first adhesive material exposed by the notches of the first and second end caps.

In one method, the step of securing the seal arrangement to the block of filter media and the first and second end caps includes locating a shut-off material between the seal arrangement and the block of filter media and first and second end caps and then inserting the second adhesive material between the seal arrangement and the block of filter media and first and second end caps.

In one method, the seal arrangement includes a rigid support member and a flexible housing seal member attached to the rigid support member.

In one method, the method includes providing a permeable mesh material overlapping the second flow face and the first and second sides. Attaching the first and second end caps includes overlapping the rectangular sidewall portions of the first and second end caps over the permeable mesh material.

In one method, the permeable mesh material has opposed first and second ends that extend between the first and second end caps. The first and second ends of the mesh material are spaced apart from the first flow face such that the permeable mesh material overlaps less than the entire first side and overlaps less than the entire second side. Securing the seal arrangement includes overlapping the seal arrangement over the first and second ends of the permeable mesh material.

In one method, attaching the first and second end caps with the first adhesive includes providing an amount of the first adhesive material such that it does not flow out of the first and second end caps other than at the first and second notches.

In a further embodiment a filter is provided. The filter includes a filter media pack, first and second preform members and first and second adhesives. The first preform member is disposed over the media pack. The first preform member has a wall defining a well. The wall defines a notch. The first adhesive in the well attaches the first preform member to the filter media pack. The first adhesive has a contact region disposed in the notch. The second preform member is disposed over the first preform member. The second adhesive bonds the first preform member over the first preform member. The second adhesive engages with the first adhesive at the contact region.

In one embodiment, the first preform member comprises first and second end caps attached to opposing ends of the filter media pack. The notch includes a first pair of notches on the first end cap and a second pair of notches on the second end cap. The second preform member comprises a border frame with an attachment portion surrounding the filter media pack and the end caps. The border frame overlaps each of the notches.

In one embodiment, a housing seal is supported by the border frame.

In one embodiment, the second adhesive surrounds and discretely engages with the first adhesive at each of notches of the first and second pairs of notches and provides a seal between the border frame and the filter media pack.

In one embodiment, the first preform member comprises an end cap having an end panel portion and an outer wall portion surrounding the end panel portion to define the well. The outer wall portion extends above the end panel portion to define a free edge. The notch is formed in the free edge.

In one embodiment, the first adhesive is filled to a level below the free edge and above a bottom of the notch.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 9 is a partial cross-sectional illustration of the filter element of FIGS. 2 and 3 prior to dispensing a final adhesive that secures the seal arrangement to the filter media;

FIG. 10 is similar to FIG. 9 but illustrates the adhesive being applied; and

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
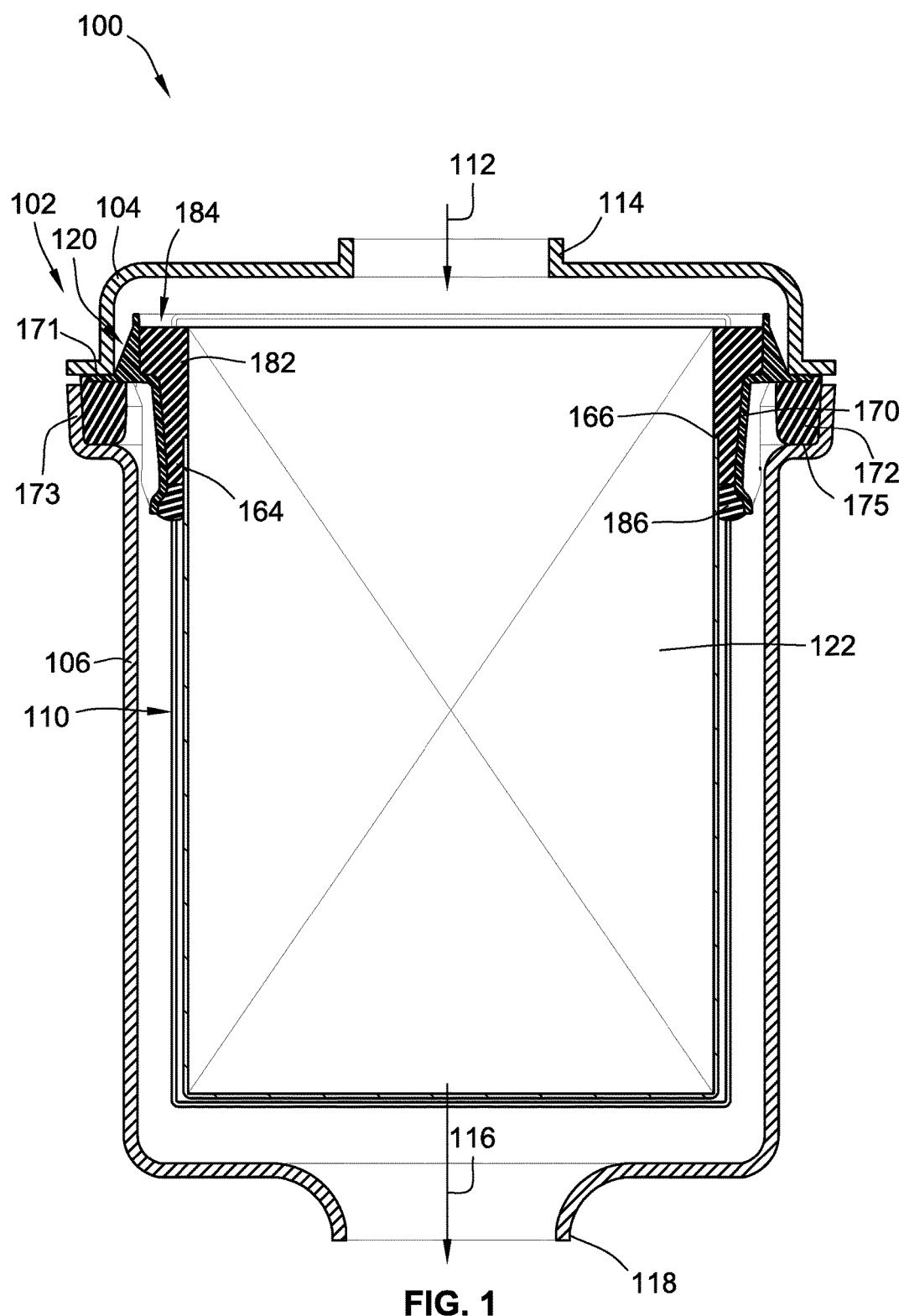
FIG. 1 is a simplified cross-sectional illustration of a filter system according to an embodiment of the invention.

FIG. 1 is a cross-sectional illustration of a filter system according to an embodiment of the present invention. The filter system 100 includes a filter housing 102 illustrated in the form of a cover 104 and a housing body 106. The filter system 100 includes a filter element 110 operably mounted fluidly between the cover 104 and the housing body 106. The filter system 100 is used to filter dirty fluid 112 (illustrated in simplified form by arrow 112) that enters through an inlet 114 and exits as clean fluid 116 (illustrated in simplified form by arrow 116) through outlet 118.

The filter element 110 is replaceable and removably mounted within the filter housing 102 such that when it becomes spent, it can be serviced or replaced with a new clean filter element 110. A seal arrangement 120 cooperates with one or more of the housing 102 components to prevent dirty fluid 112 from bypassing the filter element 110 and particularly filter media 122 thereof.

Figure 2:
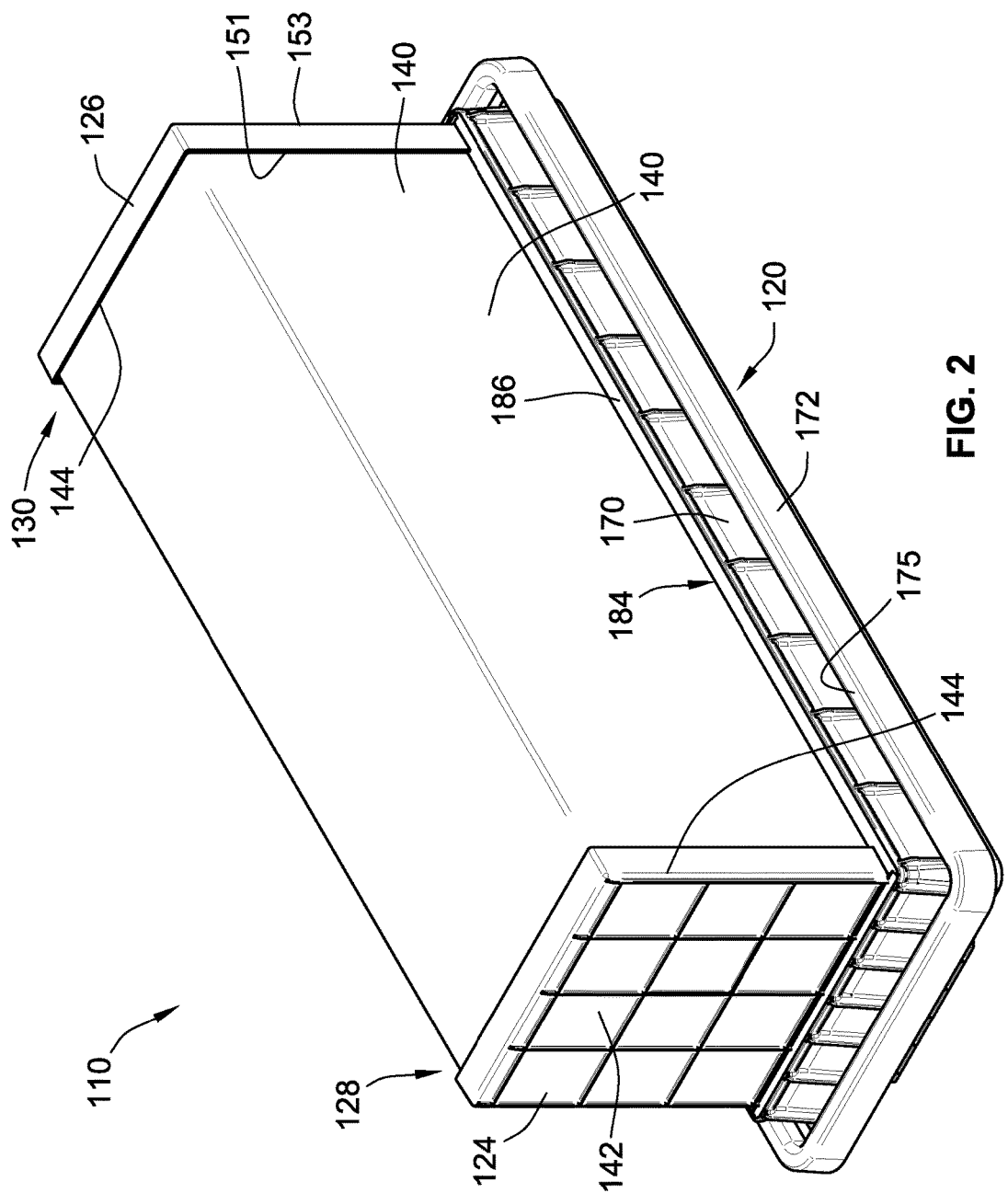
FIGS. 2 and 3 are perspective illustrations of the filter element of the filter system of FIG. 1.
Figure 3:
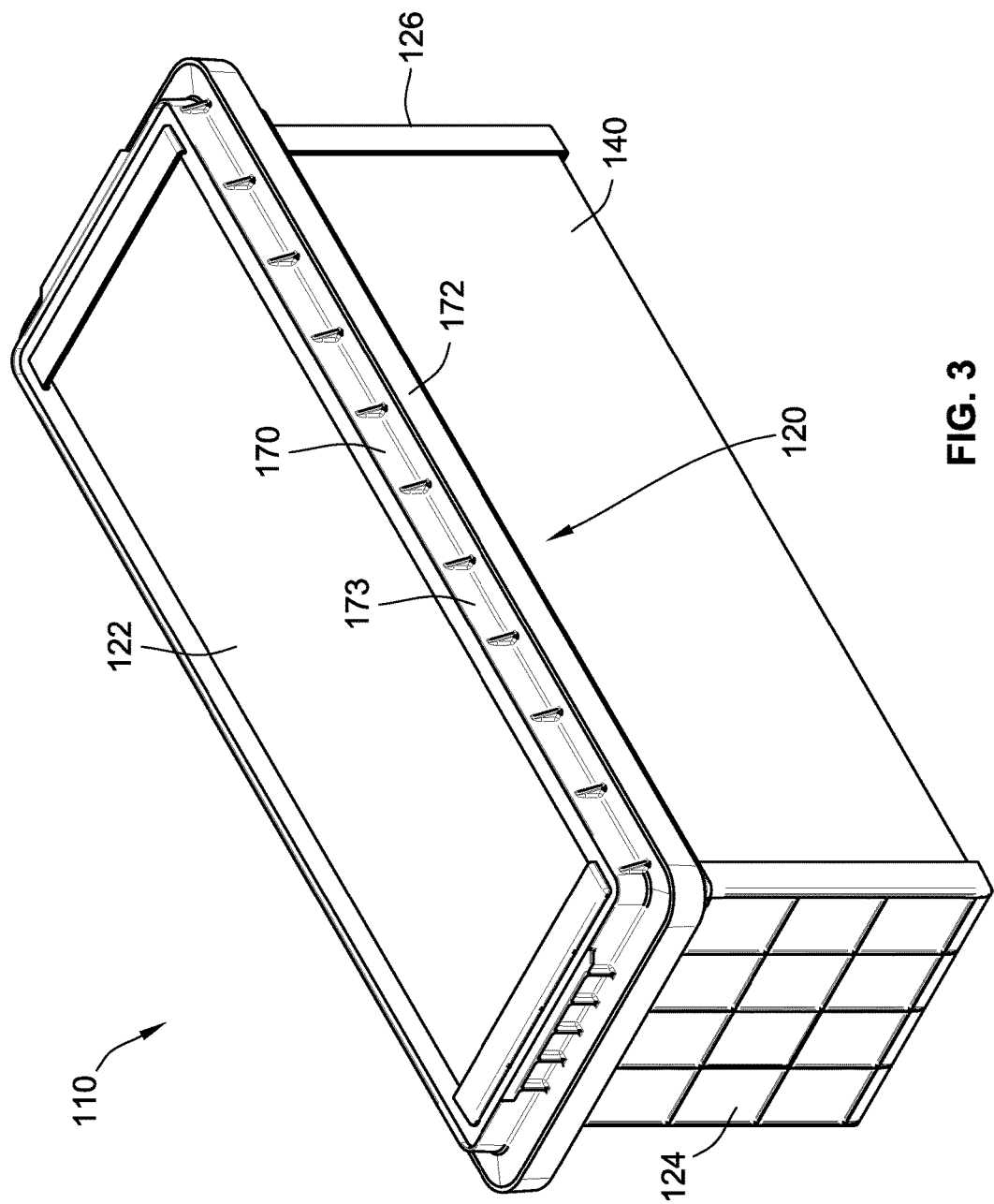

FIGS. 2 and 3 illustrate the filter element 110 removed from the filter housing 102. The filter media 122 (FIG. 3) of the filter element 110 is formed into a rectangular block, the block of filter media may also be referred to as a media pack. The filter media 122 may be pleated media formed from a single sheet of filter media folded to form a plurality of panels, a block of fluted media formed from a corrugated layer attached to a facer sheet, or other block type media.

End caps 124, 126 are attached to opposed ends 128, 130 to close off any potential leak paths that could be provided by the filter media 122, e.g. the gaps formed between adjacent panels of pleated media or any flutes that may have been severed during the formation of the block of media from fluted media, etc. If pleated media is used, the folds forming a plurality of pleats would extend between the end caps 124, 126.

Figure 4:
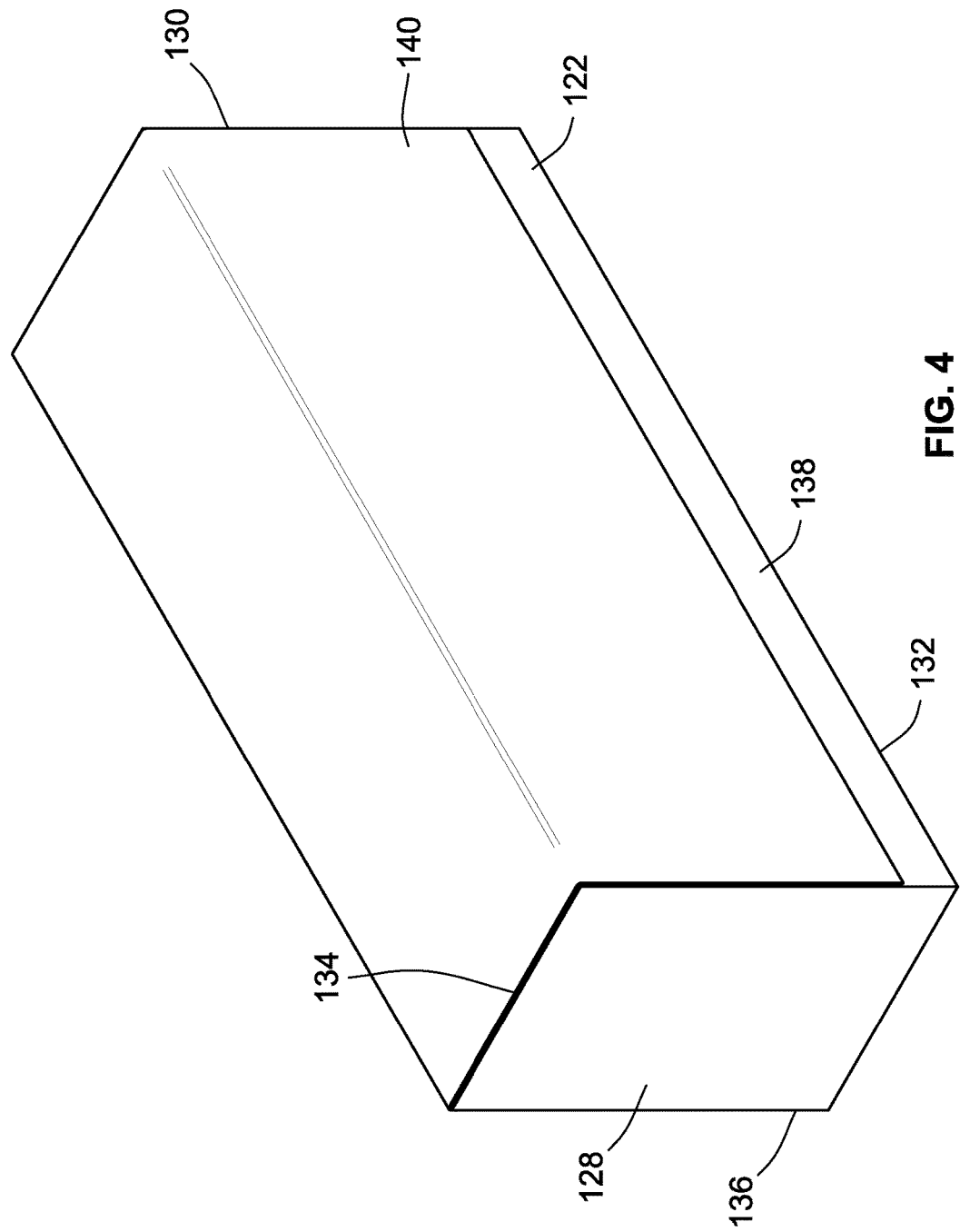
FIG. 4 is a perspective illustration of a block of filter media having a mesh layer overlapping portions of the block of filter media.

With additional reference to FIG. 4, the block of filter media 122 defines first and second flow faces 132, 134 that extend transversely, and particularly perpendicularly in the illustrated embodiment, between the opposed ends 128, 130. The first and second flow faces 132, 134 in this embodiment are generally planar and parallel to one another. In the illustrated embodiment, flow face 132 would be an inlet flow face while flow face 134 would be an outlet flow face. The block of filter media 122 includes opposed first and second sides 136, 138 that extend transversely, and particularly perpendicularly in the illustrated embodiment, between the opposed ends 128, 130 and the opposed flow faces 132, 134. The opposed sides 136, 138 are generally planar and parallel to one another. The opposed ends 128, 130 are generally planar and parallel to one another.

In this embodiment, an outer mesh layer 140 overlaps, at least in part, three faces of the block of filter media 122 and particularly flow face 134 and opposed sides 136, 138. The outer mesh layer 140 provides support to the filter media 122 due to the forces generated by the fluid, e.g. air, flowing through the filter media 122.

Figure 5:
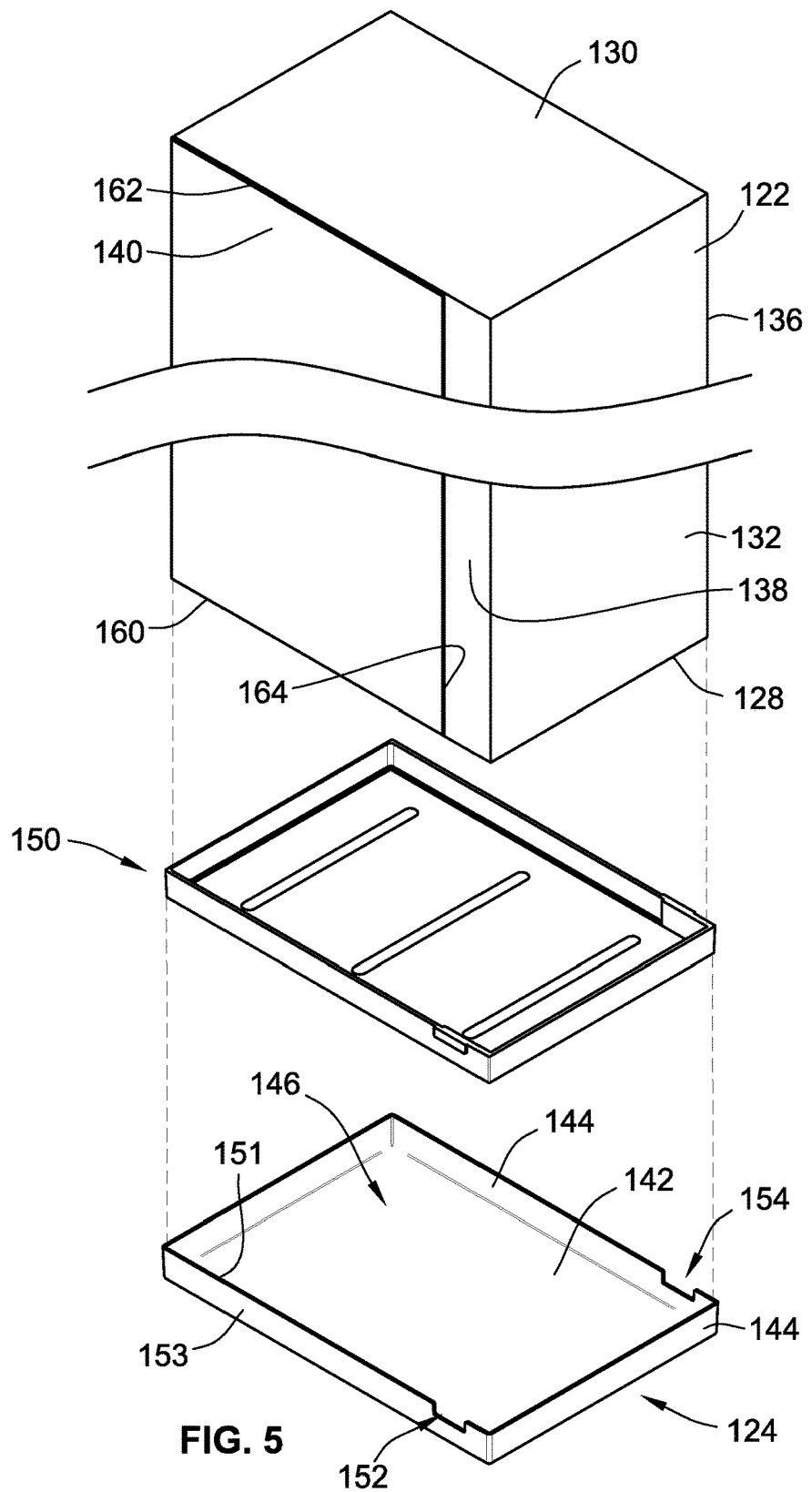
FIG. 5 is an exploded partial illustration of the block of filter media prior to attaching an end cap.
Figure 6:
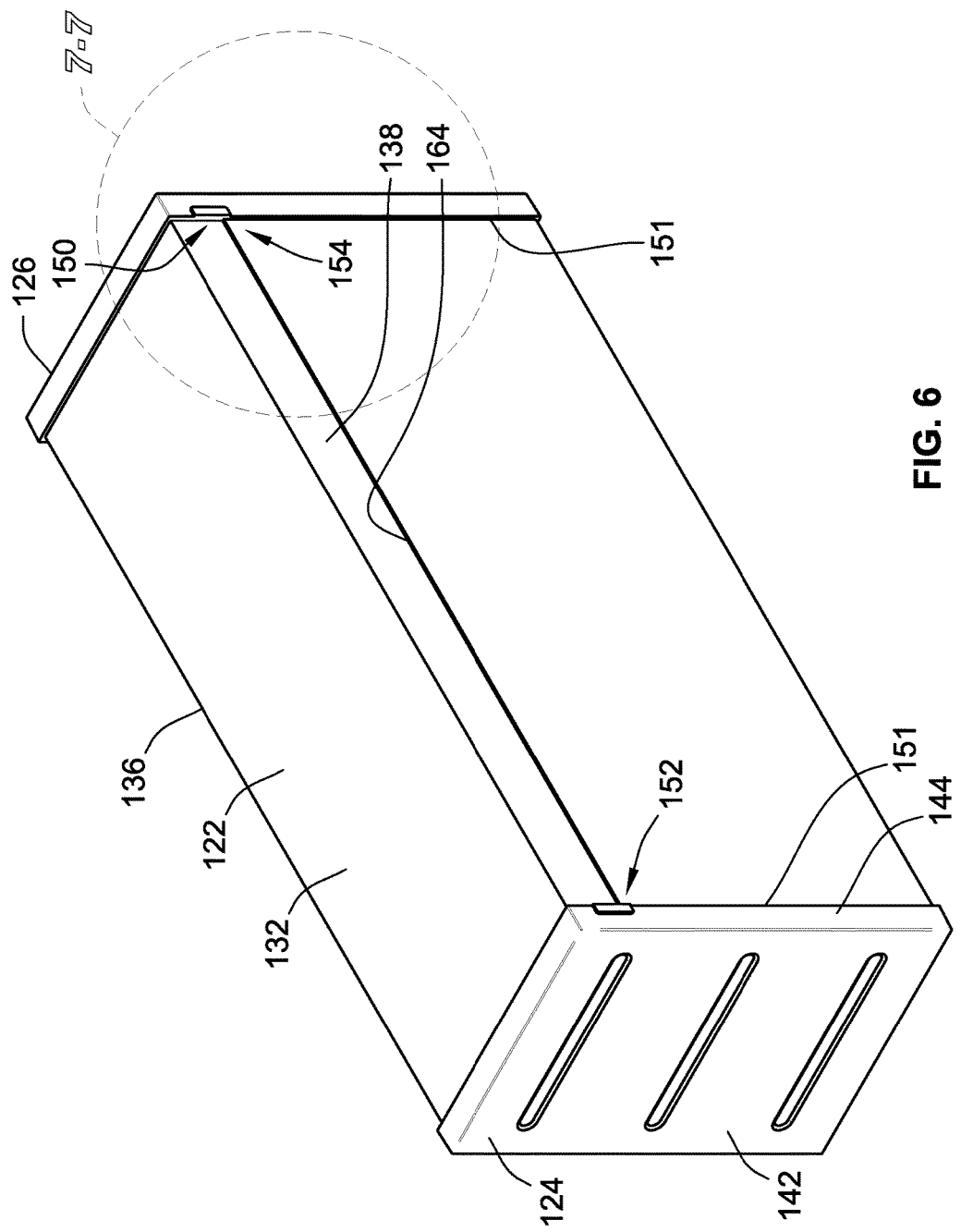
FIG. 6 is an illustration of the block of filter media after the end caps have been attached by prior to attaching the seal arrangement.
Figure 7:
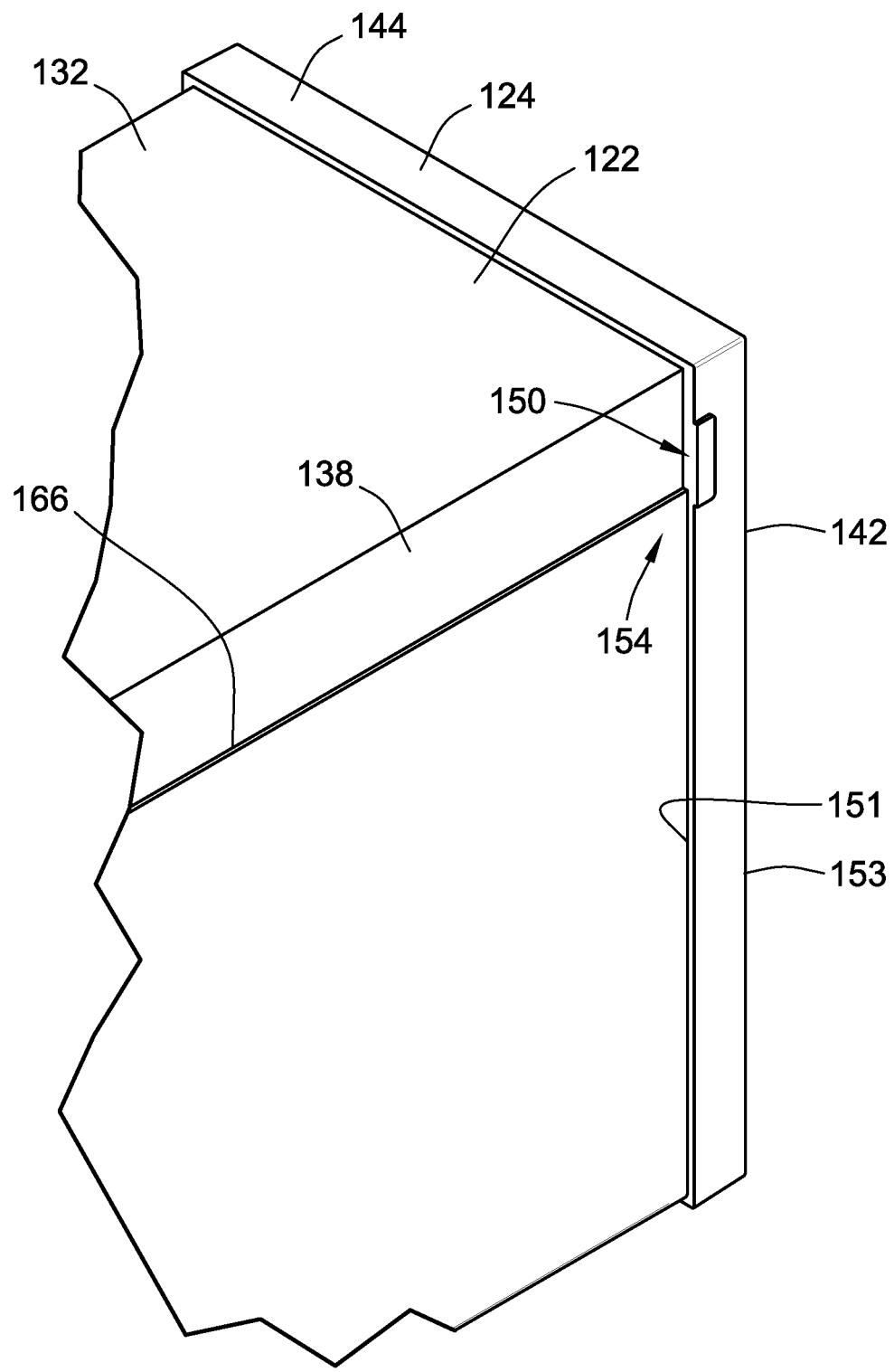
FIG. 7 is an enlarged illustration of a portion of FIG. 6.

With reference to FIG. 5, each end cap 124, 126 (while only one is illustrated the two are substantially identical and will be described with reference to end cap 124) includes a panel portion 142 (also referred to as an end panel portion) and a rectangular sidewall portion 144 extending outward from the panel portion 142. The rectangular sidewall portion 144 is attached to the panel portion 142 at a base end 153 and terminates in a free end 151. The panel portion 142 and sidewall portion 144 define a well 146 that axially receives the block of filter media 122 and outer mesh layer 140 at end 128. The end cap 124 may be considered to be cup-shaped. The end cap 124 is typically a preformed component that is formed prior to being attached to the filter media 122. For example, the end cap 124 could be formed from molded plastic. Other materials could be used, such as formed metal and more particularly sheet metal. The end caps may be referred to as a preform member.

The end cap 124 can include a plurality of ribs (not shown) that extend inward toward the filter media 122 that act as stand-offs when attaching the end cap 124 to the filter media 122. A first adhesive material 150 will be located within well 146 to adhesively secure the end cap 124 to the filter media 122. However, it is preferred if the amount of the first adhesive material 150 is such that it does not flow outward beyond a free end 151 of the rectangular sidewall portion 144. As such, the first adhesive material 150 remains hidden behind end caps 124, 126.

The end cap 124 and particularly rectangular sidewall portion includes first and second notches 152, 154. When mounted to the filter media 122, the rectangular sidewall portion 144 and notches 152, 154 overlap the sides 136, 138 of the filter media 122. In this embodiment, the rectangular sidewall portion 144 and additionally the notches 152, 154 overlap the opposed sides 160, 162 of the mesh layer 140. In the illustrated embodiment, a sufficient amount of the first adhesive material 150 will be located in the well 146 of the end cap 124 such that it is located adjacent and/or within notches 152, 154 such that a portion of the first adhesive 150 is exposed via the notches 152, 154 prior to mounting the seal arrangement 120. The exposed portion of the first adhesive 150 provides a contact region. The exposed portion extends outward beyond a bottom of the notches 152, 154 but inward of the free end 151 of sidewall portion 144.

Further, the mesh layer includes first and second ends 164, 166 (see FIG. 1) that extend transversely between the sides 160, 162 as well as between ends 128, 130 of the media. The ends 164, 166 are offset from the first flow face 132 such that a portion each of sides 136, 138 of the block of filter media 122 is exposed. The ends 164, 166 of the mesh layer 140 and the sides 136, 138 thus form an interface therebetween. In this embodiment, the notches 152, 154 of both end caps 124, 126 align with this interface such that ends 164, 166 of the mesh layer 140 align with and extend through the notches 152, 154 of the end caps 124, 126 when secured to the filter media 122. In this embodiment, the notches 152, 154 have a same spacing relative to the flow faces 132, 134 of the filter media. However, alternative embodiments could have it so that the notches of a same end cap 152 or 154 have a different spacing relative to the flow faces 132, 134 or alternatively the notches 152, 154 of one end cap 124 have a same spacing relative to the flow faces 132, 134 while the notches 152, 154 of a second end cap 126 have the same spacing relative to the flow faces 132, 134 but that is different than the spacing of the other end cap 124. Different spacing is typically provided when the seal arrangement is at an angled orientation relative to the flow faces and it is desired to fully cover the exposed first adhesive material with the seal arrangement.

Figure 8:
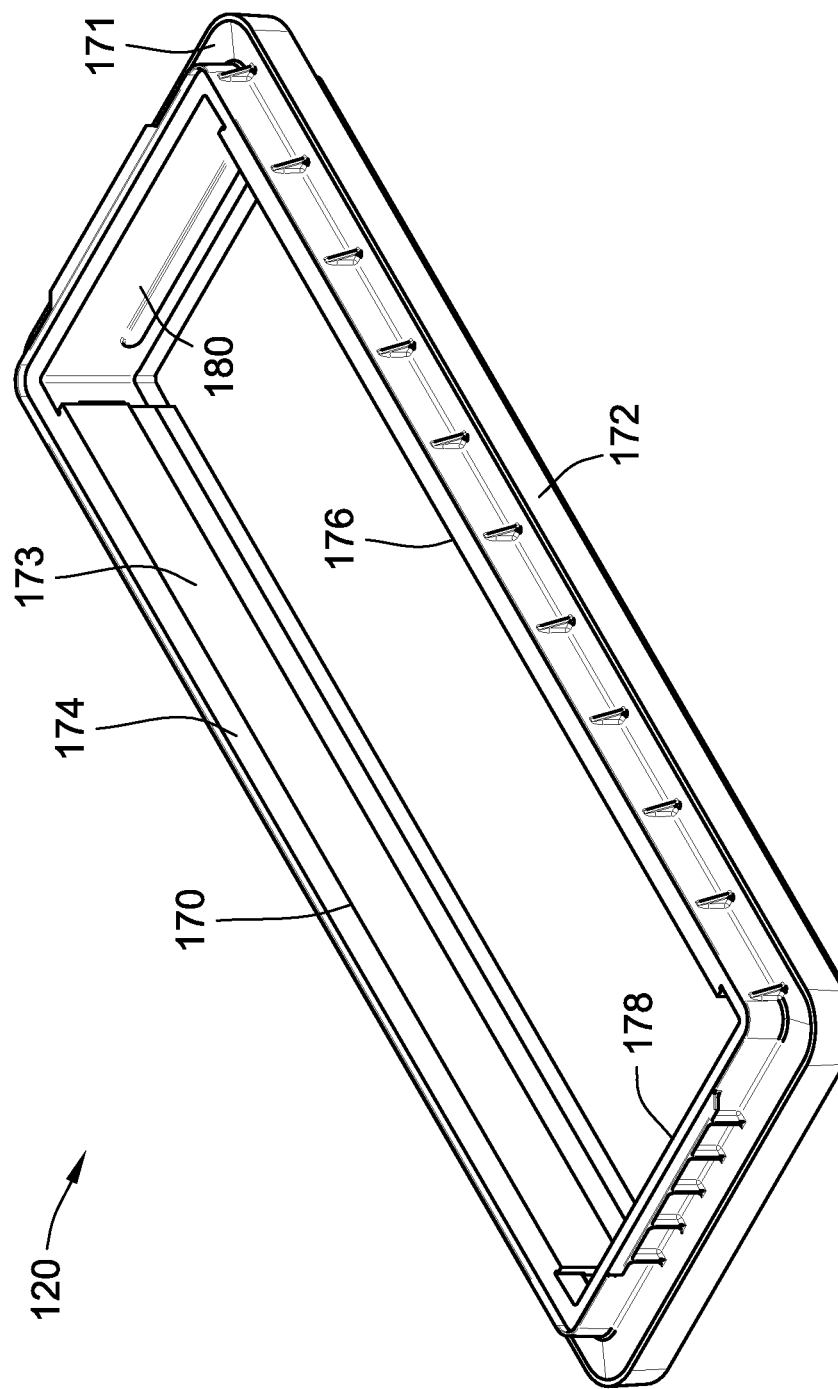
FIG. 8 is an illustration of the seal arrangement prior to mounting it to the filter media and end caps of FIG. 6.

With reference to FIG. 8 and FIG. 1, the seal arrangement 120 is rectangular and in the illustrated embodiment includes a preform member in the form of a preform frame member 170 (also referred to as a border frame) and a housing seal member 172. The housing seal member 172 is mounted to the frame member 170 and defines a housing seal surface that is an axial sealing surface 175 in this embodiment. The housing seal surface 175 is axially compressed into a portion of the housing body 106 to form a seal when installed (see e.g. FIG. 1). However, in other embodiments, the housing seal surface could be a radially directed seal designed to provide a radially directed sealing engagement with the housing body 106.

The housing seal member 172 could be a separately formed gasket, e.g. a boot gasket that is attached to the frame member 170. Such a gasket could be adhesively secured to the frame member or could simply be secured thereto due to the shape and fit of the gasket. Further yet, the housing seal member 172 could be molded directly to the frame member 170. The housing seal member 172 is typically formed from a softer material than the frame member 170. The housing seal member 172 could be a urethane, such as polyurethane or a foamed urethane material.

The frame member 170 includes a radially outward extending support flange 171 that axially supports the housing seal member 172. The support flange 171 extends radially outward from an annular sidewall portion 173 of the frame member 170. The annular sidewall portion 173 has a stepped inner surface 175 that faces towards the filter media 122.

The seal arrangement 120 has opposed sides and opposed ends defined, at least in part, by sides 174, 176 and ends 178, 180 of the frame member 170, and particularly sidewall portion 173. The sides of the seal arrangement 120 extend generally parallel to the first and second flow faces 132, 134 in this embodiment.

With reference to FIGS. 1-3, the seal arrangement 120, and particularly the annular sidewall portion 173 of the frame member 170, extends around, at least in part, the filter media 122 and end caps 124, 126. Further, the seal arrangement 120 is axially aligned along the flow axis of fluid through the filter media 122 with the interface between ends 164, 166 of the mesh layer 140 and filter media 122 as well as notches 152, 154 in the end caps 124, 126.

With reference to FIG. 1, a second adhesive material 182 secures the seal arrangement 120 to the filter media 122. The second adhesive material provides a seal between the frame member 170 and filter media 122. The second adhesive material 182 will typically be the same as the first adhesive material 150 used to secure the end caps 124, 126 to the filter media 122. Often, the adhesive material will be a foamed urethane material. Further, the adhesive will preferably axially overlap with the ends 164, 166 of the mesh layer 140.

This particular orientation and overlap configuration of the adhesive with the notches 152, 154 and ends 164, 166 of the mesh layer 140 increases the prevention of a leak path between the seal arrangement 122 and the rest of the filter element 102. Further, the second adhesive material 182 contacts and engages the first adhesive material 150 that is exposed by each of the notches 152, 154 to improve the attachment and sealing at the junction where the free ends 151 of the rectangular sidewall portions 144 meet the sides 136, 138 of the filter media 122/outer mesh layer 140. Preferably, the seal arrangement 120 fully covers the first and second notches 152, 154 of each end cap 124, 126.

The outer annular sidewall portion 173 of the frame member 170 is sized larger than the outer periphery of the filter media 122 such that a gap 184 is formed therebetween when the seal arrangement 120 is located around the filter media 122. The second adhesive material 182 is located within this gap 184.

With additional reference to FIGS. 9 and 10, during assembly of the filter element 102, the frame member 170 is located around the filter media 122 as well as the ends 164, 166 of mesh layer 140. A shut-off material 186 is located between the frame member 170 and the filter media 122 to close off one end of gap 184. The shut-off material 186 could be a preformed component, such as a foam, or a liquid material that cures. For example, the shut-off material could be an adhesive material, such as a caulk, an uncured urethane, etc.

Once the shut-off material 186 is in place and, if necessary sufficiently cured, the second adhesive material 182 (FIG. 10) can be dispensed into gap 184. Prior to applying the second adhesive material 182, the gap 184 will align with notches 152, 154 and first adhesive material 150 such that the two adhesive material can contact one another during assembly to provide improved leak prevention.

For purposes of this disclosure, the mesh material may be considered to be part of the block of filter media and the inclusion of an intervening structure between the filter media and the adhesive securing the seal arrangement to the filter media shall be included when it is stated that an adhesive is used to secure the seal arrangement to the filter media or filter media pack.

Figure 11:
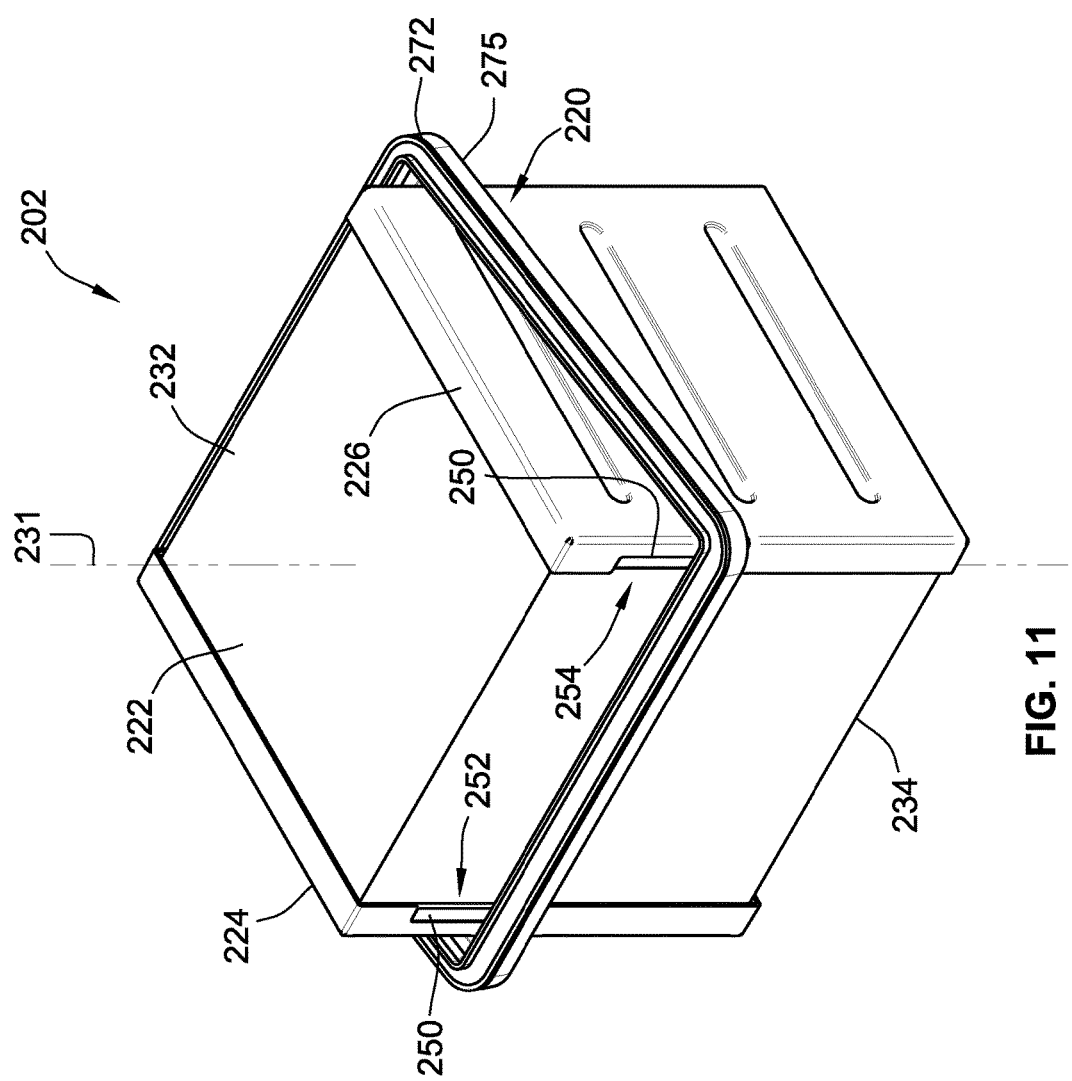
FIG. 11 is a further embodiment of a filter element according to the invention.

FIG. 11 illustrates a further embodiment of a filter element 202. This filter element would be used in a filter housing to form a filter system similar to filter system 100 described above. The features of that system and filter element 102 are incorporated into this embodiment and only the differences will be described. As such, any features described above are equally applicable to this embodiment unless expressly contradicted.

In this embodiment, the seal arrangement 220 and particularly sealing surface 275 of housing seal member 272 extends at a non-parallel and non-perpendicular angle relative to the flow faces 232, 234 of filter media 222.

The filter element 202 again includes a pair of end caps 224, 226 mounted to the filter media 222 and the seal arrangement 220 extends around the end caps 224, 226 and filter media 222. Additionally, the end caps 224, 226 include notches 252, 254 that expose an engagement portion of the first adhesive 250 used to secure the preformed end caps 224, 226 to the filter media 222.

However, these notches 252, 254 are much longer in the axial direction, e.g. parallel to the flow axis 231 through the filter media 232, 234 and perpendicular to the flow faces 232, 234. The increase length allows for the seal arrangement 220 to have the angled orientation but to additionally allow the second adhesive material to contact and engage the exposed portion of the first adhesive material in the notches 252, 254. Rather than using enlarged/lengthened notches 252, 254, using notches having different spacings from the flow faces 232, 234 as discussed above could be incorporated.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
    a block of filter media defining first and second flow faces, first and second sides extending between the first and second flow faces, and first and second ends extending between the first and second flow faces and the first and second sides;
    first and second end caps attached to the first and second ends of the block of filter media, respectively, each of the first and second end caps including a panel portion and a rectangular sidewall portion extending outward from the panel portion, the rectangular sidewall portion overlapping the first and second flow faces and the first and second sides, the rectangular sidewall portion including first and second notches, the first notch overlaps the first side and the second notch overlaps the second side;
    first adhesive material securing the first and second end caps to the first and second ends of the block of filter media, respectively, each of the first and second notches in the first and second end caps exposing a portion of the first adhesive material;
    a seal arrangement attached to the block of filter media and extending, at least in part, around the block of filter media and the first and second end caps;
    a second adhesive material sealingly securing the seal arrangement to the block of filter media and the first and second end caps, the second adhesive material contacting the first adhesive material exposed by the notches of the first and second end caps.

2. The filter element of claim 1, wherein the block of filter media is a block of pleated filter media formed from a plurality of folds and pleat panels forming a plurality of pleats, the folds and pleat panels extending between the first and second ends, the first and second end caps and first adhesive material sealing opposed ends of the pleats.

3. The filter element of claim 1, wherein the first and second adhesive materials are the same type of material.

4. The filter element of claim 1, wherein the first and second adhesive materials are foamed urethane.

5. The filter element of claim 1, wherein the rectangular sidewall portion defines a free end and a base end, the rectangular sidewall portion being attached to the panel portion at the base end, the first adhesive material not extending beyond the free end of the rectangular sidewall portion.

6. The filter element of claim 1, wherein the seal arrangement fully covers the first and second notches are fully covered by the seal arrangement.

7. The filter element of claim 1, wherein all of the first and second notches have a same spacing relative to the first flow face.

8. The filter element of claim 1, wherein the first and second notches of the first end cap have a different spacing relative to the first flow face than the first and second notches of the second end cap.

9. The filter element of claim 1, wherein the first notches of the first and second end caps have a same first spacing relative to the first flow face and the second notches of the first and second end caps have a same second spacing relative to the first flow face, wherein the first and second spacings are different.

10. The filter element of claim 1, wherein the seal arrangement includes a frame member and a housing seal member attached to the frame member.

11. The filter element of claim 1, further comprising a shut-off material located between the seal arrangement and the block of filter media to provide a shut-off between the seal arrangement and the block filter media inhibiting leakage of the second adhesive during assembly.

12. The filter element of claim 1, further including a permeable mesh material overlapping the second flow face and the first and second sides.

13. The filter element of claim 12, wherein the permeable mesh material has opposed first and second ends that extend between the first and second end caps, the first and second ends of the mesh material being spaced apart from the first flow face such that the permeable mesh material overlaps less than the entire first side and overlaps less than the entire second side, the seal arrangement overlaps the first and second ends of the permeable mesh material.

14. The filter element of claim 1, wherein the seal arrangement has opposed sides with the block of filter media positioned therebetween, the opposed sides extending at a non-zero and non-perpendicular angle relative to the first and second flow faces, the opposed sides of the seal arrangement extending across either the first and second ends or the first and second sides of the block of filter media.

15. The filter element of claim 12, wherein the second flow face is an outlet flow face and the first flow face is an inlet flow face.

16. A method of assembling a filter element comprising:
    providing a block of filter media defining first and second flow faces, first and second sides extending between the first and second flow faces, and first and second ends extending between the first and second flow faces and the first and second sides;
    attaching first and second end caps to the first and second ends of the block of filter media, respectively, with a first adhesive material, each of the first and second end caps including a panel portion and a rectangular sidewall portion extending outward from the panel portion, wherein the rectangular sidewall portion overlaps the first and second flow faces and the first and second sides, the rectangular sidewall portion including first and second notches, the first notch overlaps the first side and the second notch overlaps the second side;
    wherein each of the first and second notches in the first and second end caps expose a portion of the first adhesive material;
    positioning a seal arrangement adjacent to the block of filter media with the seal arrangement extending, at least in part, around the block of filter media and the first and second end caps;
    securing, sealingly, the seal arrangement to the block of filter media and the first and second end caps with a second adhesive material, the second seal material contacting the first adhesive material exposed by the notches of the first and second end caps.

17. The method of claim 16, wherein securing the seal arrangement to the block of filter media and the first and second end caps includes locating a shut-off material between the seal arrangement and the block of filter media and first and second end caps and then inserting the second adhesive material between the seal arrangement and the block of filter media and first and second end caps.

18. The method of claim 16, wherein the seal arrangement includes a rigid support member and a flexible housing seal member attached to the rigid support member.

19. The method of claim 16, further comprising providing a permeable mesh material overlapping the second flow face and the first and second sides, wherein attaching the first and second end caps includes overlapping the rectangular sidewall portions of the first and second end caps over the permeable mesh material.

20. The method of claim 19, wherein the permeable mesh material has opposed first and second ends that extend between the first and second end caps, the first and second ends of the mesh material being spaced apart from the first flow face such that the permeable mesh material overlaps less than the entire first side and overlaps less than the entire second side;
wherein securing the seal arrangement includes overlapping the seal arrangement over the first and second ends of the permeable mesh material.

21. The method of claim 16, wherein attaching the first and second end caps with the first adhesive includes providing an amount of the first adhesive material such that it does not flow out of the first and second end caps other than at the first and second notches.

22. A filter comprising:
a filter media pack;
a first preform member disposed over the media pack, the first preform member having a wall defining a well, the wall defining a notch;
a first adhesive in the well attaching the first preform member to the filter media pack, the first adhesive having a contact region disposed in the notch;
a second preform member disposed over the first preform member,
a second adhesive bonding the second preform member over the first preform member, the second adhesive engaging with the first adhesive at the contact region.

23. The filter of claim 22, wherein the first preform member comprises first and second end caps attached to opposing ends of the filter media pack, the notch including a first pair of notches on the first end cap and a second pair of notches on the second end cap; and wherein the second preform member comprises a border frame with an attachment portion surrounding the filter media pack and the end caps.

24. The filter of claim 23, further comprising a housing seal supported by the border frame.

25. The filter of claim 24, wherein the second adhesive surrounds and discretely engages with the first adhesive at each of notches of the first and second pairs of notches and provides a seal between the border frame and the filter media pack.

26. The filter of claim 22, wherein the first preform member comprises an end cap having an end panel portion and an outer wall portion surrounding the end panel portion to define the well, the outer wall portion extending above the end panel portion to define a free edge, the notch being formed in the free edge.

27. The filter of claim 26, wherein the first adhesive is filled to a level below the free edge and above a bottom of the notch.

* * * * *